United States Patent [19]
Saruhan-Brings et al.

[11] Patent Number: 6,139,916
[45] Date of Patent: Oct. 31, 2000

[54] PROCESS FOR COATING OXIDIC FIBROUS MATERIALS WITH METAL ALUMINATES FOR THE PRODUCTION OF FAILURE-TOLERANT, HIGH-TEMPERATURE RESISTANT, OXIDATION-RESISTANT COMPOSITE MATERIALS

[75] Inventors: Bilge Saruhan-Brings, Troisdorf; Lutz Mayer, Duisburg; Hartmut Schneider, Rheinbach, all of Germany

[73] Assignee: DLR Deutsche Zentrum fur Luft und Raumfahrt E.V. Linder Hohe, Cologne, Germany

[21] Appl. No.: 09/113,512

[22] Filed: Jul. 10, 1998

[30] Foreign Application Priority Data

Jul. 11, 1997 [DE] Germany .......................... 197 29 830

[51] Int. Cl.⁷ ............................................ B05D 3/02
[52] U.S. Cl. ............................ 427/376.2; 427/434.6
[58] Field of Search ............................ 427/376.1, 376.2, 427/376.4, 376.7, 217, 404, 252, 430.1, 434.6, 436

[56] References Cited

U.S. PATENT DOCUMENTS

| | | | |
|---|---|---|---|
| 3,849,181 | 11/1974 | Green ........................................ | 117/106 |
| 4,738,896 | 4/1988 | Stevens ................................. | 428/315.9 |
| 5,227,199 | 7/1993 | Hazlebeck et al. ................... | 427/376.2 |
| 5,296,260 | 3/1994 | Sawada et al. .......................... | 427/118 |
| 5,316,797 | 5/1994 | Hazlebeck et al. ................... | 427/376.2 |
| 5,603,983 | 2/1997 | Clough et al. ......................... | 427/126.3 |

OTHER PUBLICATIONS

Dostal et al, eds., "Engineered Materials Handbook, vol. 1: Composites", pp. 5, 179, Jan. 1998.

Cinibulk, Michael K. "Synthesis and Characterization of Sol–Gel Derived Lanthanum Hexaluminate Powders and Films," J. Mater. Res. vol. 10, No. 1, Jan. 1995, pp. 71–76.

Morgan, Peter E. D. et al., "Ceramic Composites of Monazite and Alumina,", J. Am. Ceram. Soc., 78[6] 1553–63 (1995), (No Month).

Gundel, D.B., et al., "Fabrication of thin oxide coatings on ceramic fibres by a sol–gel technique," J. Mat. Sci., 29: 1795–1800 (1994), (No month).

Brown, Peter W., "Metalorganic Chemical Vapor Deposition of $LaAl_{11}O_{18}$ by a Liquid Precursor Route," Extended Abstract, Ceram. Eng. Sci. Proc., 16[4] 385–387 (1995), (No month).

P. Peshev, V. Slavova, Preparation of Lanthanum Aluminate Thin Films by a Sol–Gel Procedure Using Alkoxide Precursors, Material Research Bulletin, vol. 29, No. 3, pp. 255–261 (1994).

H.P. Chiu, J.M. Yang, R.A. Amato, A Study of Fiber Coating in $Al_2O_3$ Fiber–reinforced NiAlFe Matrix Composites, Material Science and Engineering, A203, pp. 81–92 (1995).

P.W. Brown, Metallorganic Chemical Vapor Deposition of $LaAl_{11}O_{18}$ by a Liquid Precursor Route, Proceedings of the Annual Conference and Exposition on Composites, Advanced Ceramics, Materials and Structures–Part A; Cocoa Beach, Fla, USA, Jan. 8–12, 1995.

M. K. Cinibulk, R. S. Hay, Textured Magnetoplumbite Fiber–Matrix Interphase Derived from Sol–Gel Fiber Coatings, J. Amer. Cer. Soc., pp. 1233–1246 (1996).

*Primary Examiner*—Shrive Beck
*Assistant Examiner*—Paul Strain
*Attorney, Agent, or Firm*—Baker & Botts LLP

[57] ABSTRACT

The present invention relates to a process for coating high-temperature-resistant fibrous materials with metal aluminates. The disclosed process includes immersing the starting fibrous material in a sol derived from at least two compounds: a compound of cerium or lanthanum and a compound of aluminum, to deposit a coating of metal aluminate on the fibrous material. The compounds of cerium, lanthanum and aluminum are selected from nitrates, acetates, oxalates and acetylacetonates. After the immersion, the fibrous material is removed from the sol after it is wetted, dried at temperatures of less than 400 degrees C. for at least 1 hour under pressure of less than or equal to 5 mbar and the fibrous material is introduced into a desired matrix at a temperature of more than 600 degrees C.

8 Claims, 8 Drawing Sheets

Coated Fiber

Coated Fiber

Coated Fibers; side elevation view

Coated Fiber (melt impregnation at 250°C, pressure < 1 mbar)

Fibers with coating (melt impregnation at 250°C, < 1 mbar)

Fiber fired at 1250°C (2h) with coating
(melt impregnation at 250°C, < 1 mbar)

Fiber/mullite composite material; fracture behavior: brittle fracture

Fiber/mullite composite material; fracture behavior: brittle fracture

Composite material with coated fibers; surface of fracture (pull out)

Empty spaces from pulled-out fibers

PROCESS FOR COATING OXIDIC FIBROUS MATERIALS WITH METAL ALUMINATES FOR THE PRODUCTION OF FAILURE-TOLERANT, HIGH-TEMPERATURE RESISTANT, OXIDATION-RESISTANT COMPOSITE MATERIALS

The present invention relates to a process for coating high-temperature resistant fibrous materials with metal aluminates, especially an oxidic coating of high- temperature resistant fibers for the production of failure-tolerant, oxidation-resistant composite materials.

There is a world-wide growing interest in the development of high-temperature resistant, oxidation-resistant, failure-tolerant ceramic materials. One central need is the production of shingles for the thermal protection of combustion chambers in aircraft power units and in energy-producing stationary gas turbines. The use of such ceramic systems increases the efficiency of the combustion in the combustion chamber and simultaneously reduces pollutant emission. Further fields of application for such materials are hot structures and thermal protection systems (TPS) for re-entry spacecrafts.

The studies first concentrated on carbon or SiC long fiber reinforced carbon, SiC and $Si_3N_4$ matrix composites. These composite materials have good mechanical properties at room temperature and at elevated temperatures. However, their oxidation-resistance is mostly low, especially at high temperatures. Therefore, recently, ceramic oxide-fiber reinforced oxide matrix composite systems have been increasingly developed. Of particular interest are materials with an $\alpha$-$Al_2O_3$ and mullite matrix, reinforced with $\alpha$-$Al_2O_3$, mullite or YAG fibers.

Previous studies have shown that oxide fibers are often intensively bound in the oxide-ceramic matrix. As a rule, this results in the required failure-tolerant behavior of the composite material being prevented by fiber pull-out or crack deflection along the fiber-matrix boundary. Thus, the development of a suitable boundary layer between the fiber and the matrix by coating the fiber is very important. The non-oxidic low-toughness C and BN boundary layers have a graphite sheet structure which enables crack deflection and sliding processes parallel to the respective crystallographic (0001) plane. The dissipation of cracking energy induced thereby results in an almost ideal quasi-plastic deformation behavior. However, the use of C and BN as boundary layers is highly limited by their extremely low oxidation-resistance. Beside their thermal stability under oxidizing conditions, the oxidic coating systems discussed in the literature so far, such as $LaPO_4$, $ZrO_2$ or $MgO.Al_2O_3$, also possess deleterious properties: The high proportions of ionic bonding characteristic of oxidic systems and the correlated high diffusion coefficients often lead to recrystallization, grain coarsening by crystal growth, and, above all, to reactions with coexisting composite components. This reduces failure tolerance.

As compared to non-oxidic low-toughness and prior oxidic boundary layers, lanthanoid aluminate materials have essential advantages because the oxidation-resistance of these components is essentially increased with respect to that of C and BN. On the other hand, these coating materials show neither recrystallization nor reactions with the fiber.

Peter W. Brown, Ceram. Eng. Sci. Proc. 16 (4), 385–387 (1995), describes the organometallic deposition of $LaAl_{11}O_8$ based on a liquid precursor. However, deposition from the vapor phase is extraordinarily expensive.

D. B. Gundel et al. (Journal of Materials, Sci. 29), p. 1795–1800 (1994), describe the coating of substrates, for example, fibers having diameters of more than 140 $\mu$m, by means of the sol-gel technique. The coating of fibers having diameters of less than 140 $\mu$m has not been described in the prior art, and has not been mentioned in the literature to date either. As is generally known, a sol is a colloidal solution in which a solid or liquid substance is finely dispersed in a solid, liquid or gaseous medium. A sol is converted to a gel by coagulation.

It has been the object of the present invention to improve the coating of fibrous materials, especially for the production of failure-tolerant, high-temperature resistant, oxidation-resistant composite materials based on oxide-fiber reinforced oxide matrix composite materials.

In a first embodiment of the present invention, this object is achieved by a process for coating oxidic fibrous materials with metal aluminates, characterized in that
 a) the fibrous material is wetted with a sol which is derived from compounds of metals from group 2 of the Periodic Table, with the exception of magnesium, group 13 of the Periodic Table, with the exception of boron, and/or groups 3, 4, 5 and/or 6 of the Periodic Table, with the exception of yttrium, including the lanthanoids, with the exception of samarium, and at least one aluminum compound;
 b) the fibrous material is separated from the sol;
 c) steps a) and b) are optionally repeated several times;
 d) the fibrous material is dried in the course of several hours at temperatures of up to 400° C., especially at pressures of $\leq 5$ mbar; and
 e) after being introduced in the desired matrix, the fibrous material is subjected to treatment at a temperature in the range of more than 600° C.

By means of the present invention, a process for coating high-temperature resistant fibrous materials with metal aluminates has been developed whereby failure-tolerant, high-temperature resistant and oxidation-resistant composite materials, especially based on oxide-fiber reinforced oxide matrix composite materials, are obtainable.

The fibrous materials to be employed are preferably selected from filaments, fibers, continuous filaments, fiber bundles, non-woven, knitted and/or woven fabrics. It is especially preferred according to the present invention to coat fibers in continuous bundles based on oxidic materials (mullite, $\alpha$-$Al_2O_3$, YAG, $ZrO_2$, mullite/$\alpha$-$Al_2O_3$, etc.), especially when having diameters of from 5 to 150 $\mu$m, preferably from 5 to 120 $\mu$m, more preferably from 5 to 15 $\mu$m.

Especially for this purpose, a device has been developed which allows coating and subsequent winding up of the coated continuous fiber bundles. The starting material preferably consists of Nextel® 720 continuous fiber bundles, commercially available from 3M, which are pretreated (removal of the organic auxiliary agents in a small reaction zone at 950° C.), coated, predried and finally rewound in one working cycle. It is to be pointed out, in particular, that the continuous fiber bundle is directed in such a way, before and while passing the coating sol, that divergence of the bundle into the individual continuous filaments is achieved which filaments are then drawn in parallel through the sol and subsequently recombined into a bundle. This process is equivalent to the coating of individual fibers and thus involves the same advantageous properties.

Although it is possible, according to the present invention, to coat fiber bundles, non-woven, knitted or woven fabrics, the coating of individual fibers is preferred since this provides a greater surface area with the coating as compared to the coating of fiber bundles, non-woven, knitted or woven fabrics.

Metals which may be employed in the form of compounds according to the present invention comprise, in principle, all metals of groups 3, 4, 5, and 6 of the Periodic Table, with the above-mentioned exceptions; especially among the lanthanoids, lanthanum and cerium are particularly preferred.

The number of metal compounds to be selected is extraordinarily high. Particularly preferred according to the present invention are the metal compounds selected from the nitrates, acetates, oxalates and/or acetylacetonates. In the same way, the aluminum compounds are also preferably selected from the nitrates, alcoholates, oxalates and/or acetylacetonates. With the materials mentioned, it is extraordinarily simple to prepare sols which will coagulate to gels upon temperature increase.

If compounds with the mentioned preferred anions are selected, it is possible to melt-impregnate the fibrous material under vacuum with crystal water separation, nitrate separation, crystal water evaporation, nitrate evaporation and by oxidation of the organic residues with separation or evaporation of hydrocarbons or carbon oxides. At temperatures in the range of up to 300° C., the crystal water fractions or nitrate fractions will evaporate so that only oxidic components are left above this temperature.

The treatment at a temperature in the range of more than 600° C. also comprises the use of fibrous materials in oxidation-resistant composite materials, especially in a matrix of mullite or aluminum oxide. It is particularly preferred according to the present invention to sinter the fibrous materials, for example, fabrics, under hot-press conditions, for example, at temperatures above the sintering onset temperature, at molding pressures of several MPa in the course of a few minutes.

According to the present invention, fibers of polycrystalline nature based on the chemical system $Al_2O_3$—$SiO_2$ are preferably employed. Therefore, for the composite materials described according to the invention, they have similar thermomechanical properties as the mullite matrix, in addition to sufficient strength. The fiber coating herein described prevents reactions between the fibers and the matrix. This results in a weak mechanical bonding between the fibers and the matrix which enables energy-dissipating mechanisms, such as crack deflection and fiber pull-out, and thus an increased failure tolerance.

The figures illustrate the fibers according to the invention and, in addition, provide a comparison between the different breaking behaviors of composite materials consisting of a mullite matrix and uncoated and/or coated commercially available Nextel® 720 fibers.

EXAMPLES

Example 1

Figure 1:
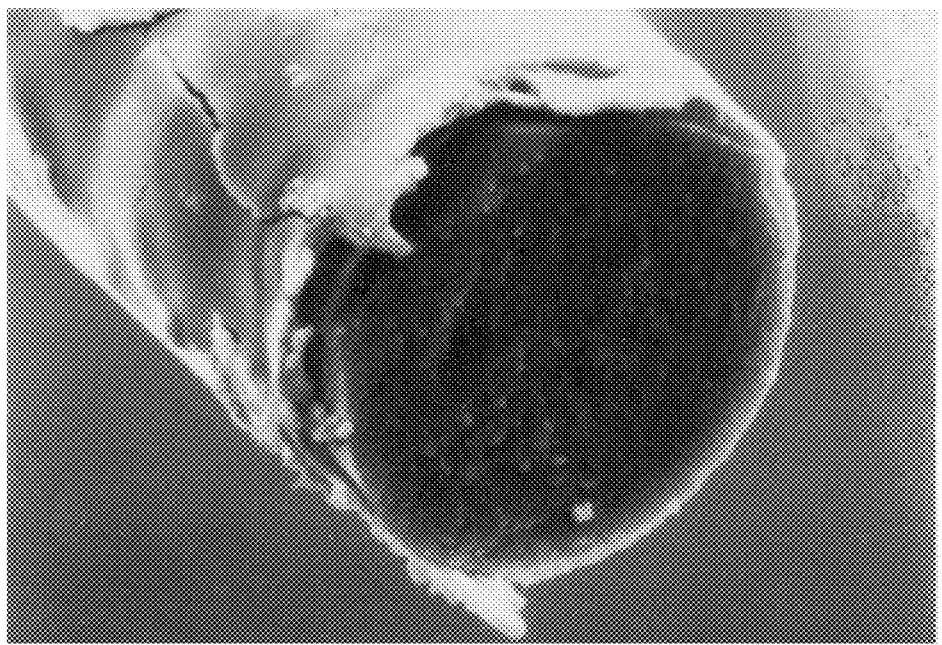
FIG. 1 shows a coated fiber in 5000 fold magnification after pressureless firing at 1200° C over a period of 2 hours. In addition to the good covering of the fiber by the coating material lanthanum aluminate (β-aluminate structure), there can be clearly seen the required weak bonding of the coating to the fiber which ensures the later failure-tolerance in the composite material.
Figure 2:
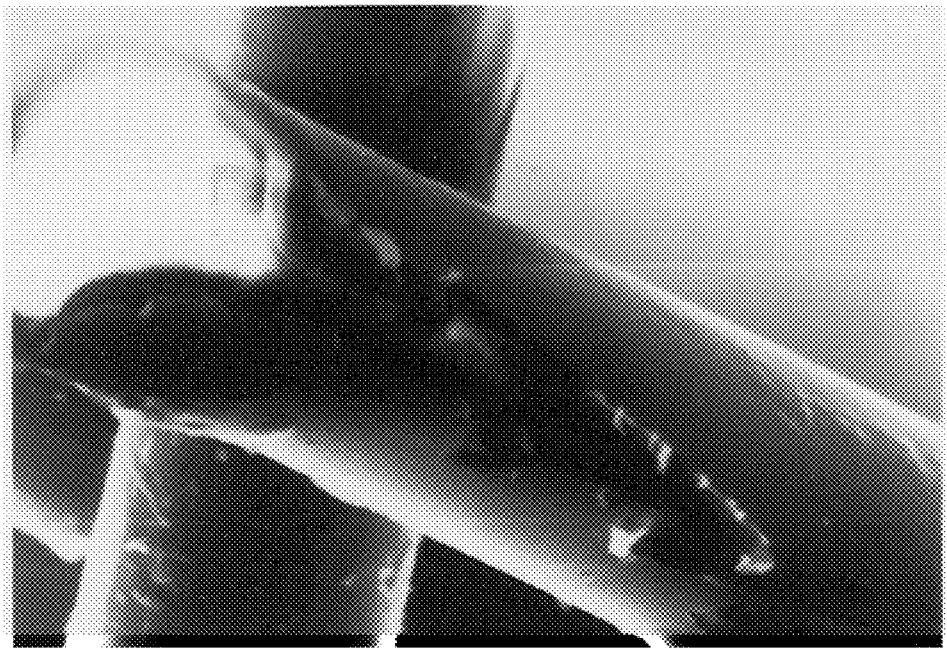
FIG. 2 shows a side elevation view of the coated fibers. The deliberate mechanical damage shown here exclusively concerns the coating and does not adversely affect the fiber as well. This effect results from the weak bonding of the coating material to the fiber.
Figure 3:
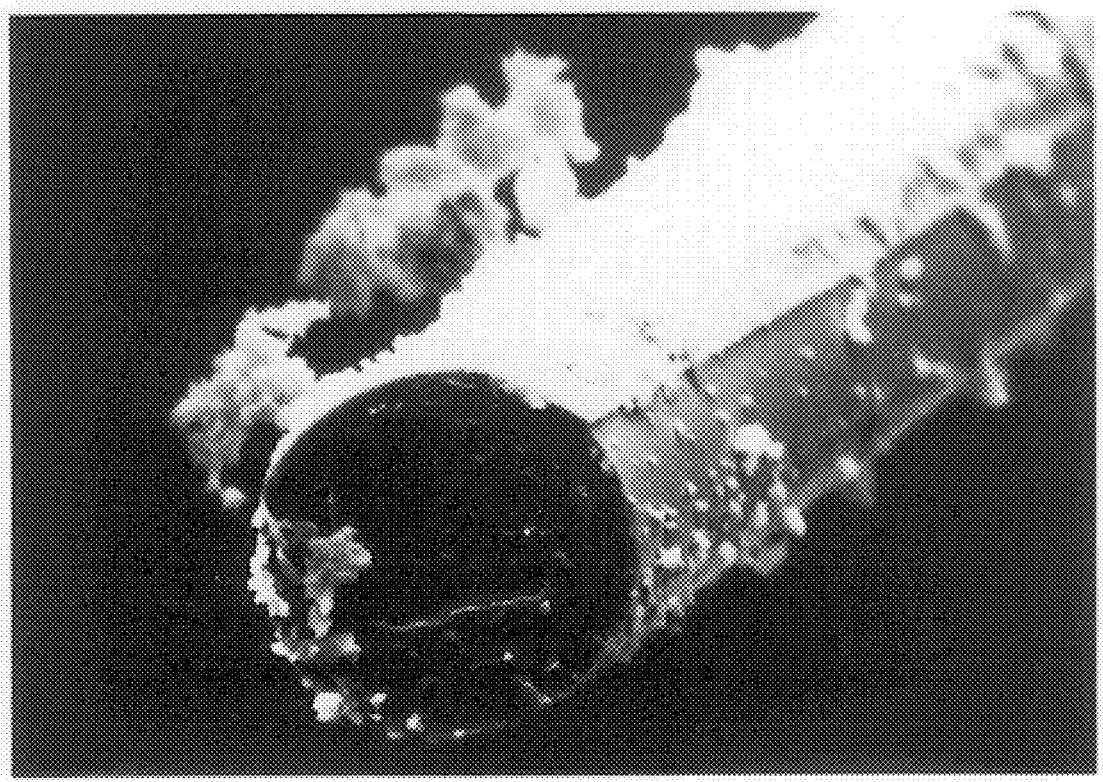
FIG. 3 shows a coated fiber which has been prepared from a fabric sheet after melt-impregnation at 250° C. under vacuum. The material has been prepared by the process according to the invention.
Figure 4:
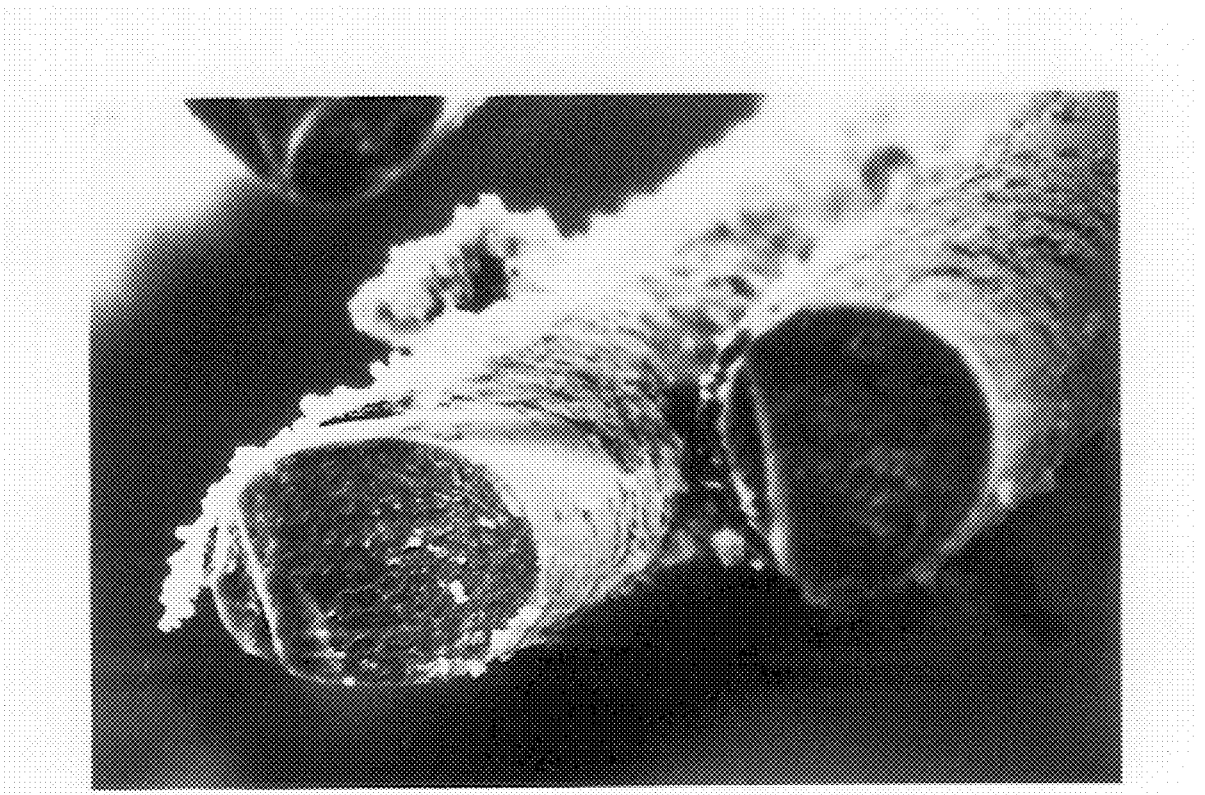
FIGS. 4 and 5 illustrate further examples of coated fibers isolated from fiber fabrics before and after being fired at 1200° C.
Figure 5:
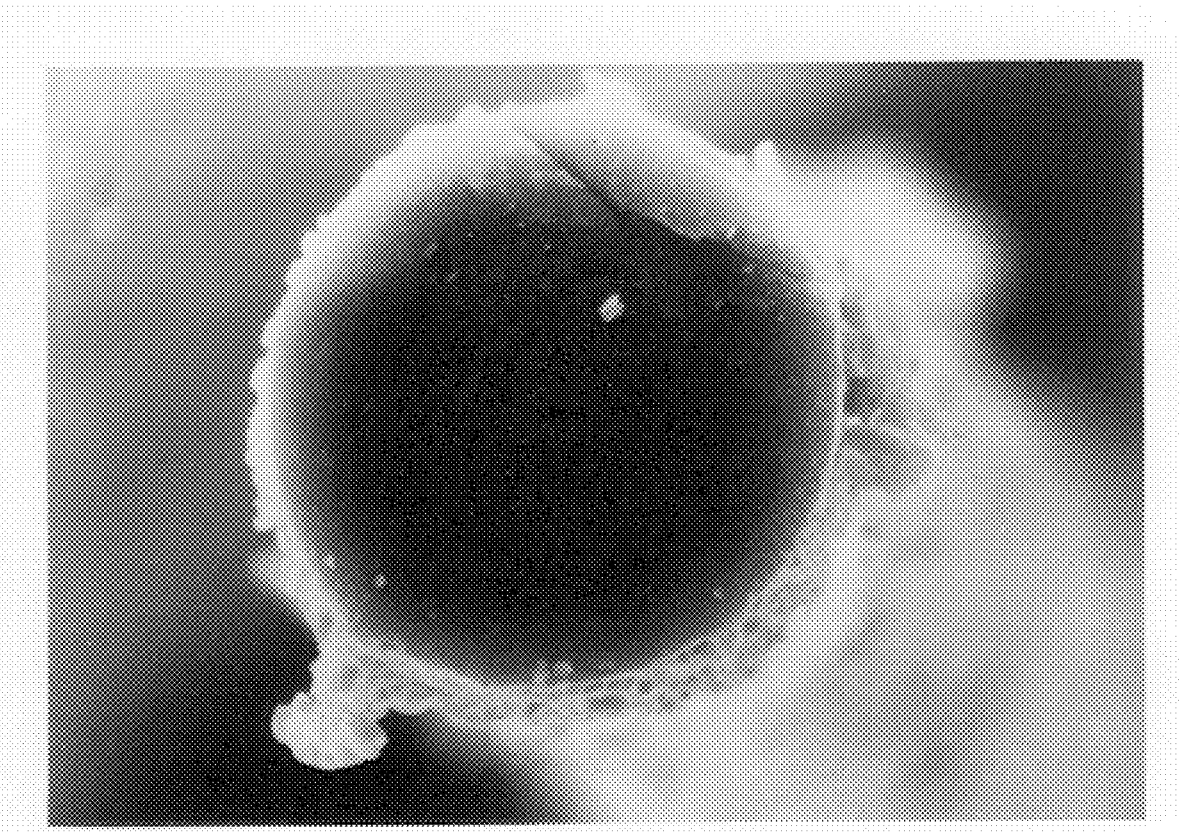
Figure 6:
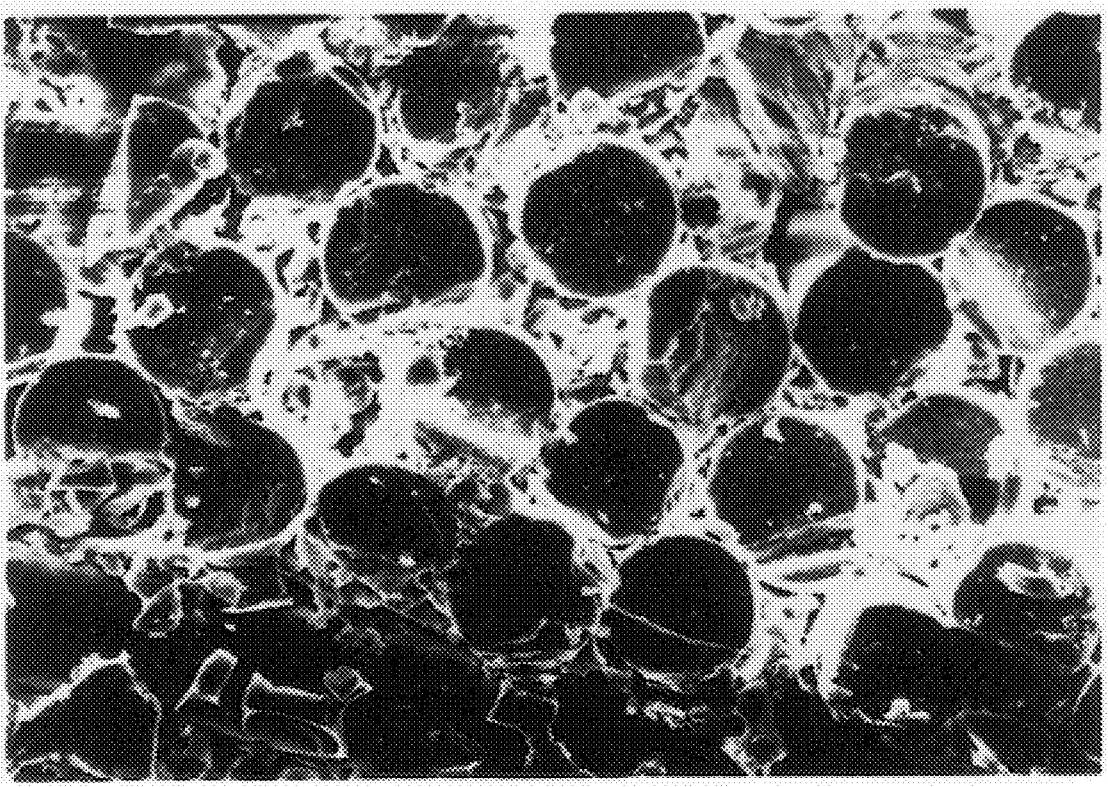
FIGS. 6 and 7 represent the surface of fracture of different composite materials. Thus, these Figures show the brittle fracture behavior of a composite material without a boundary layer, consisting of Nextel® 720 fibers and a mullite matrix. The conditions of hot-pressing are identical with those of the composite materials according to the invention, so that a direct comparison is possible without any limitations.
Figure 7:
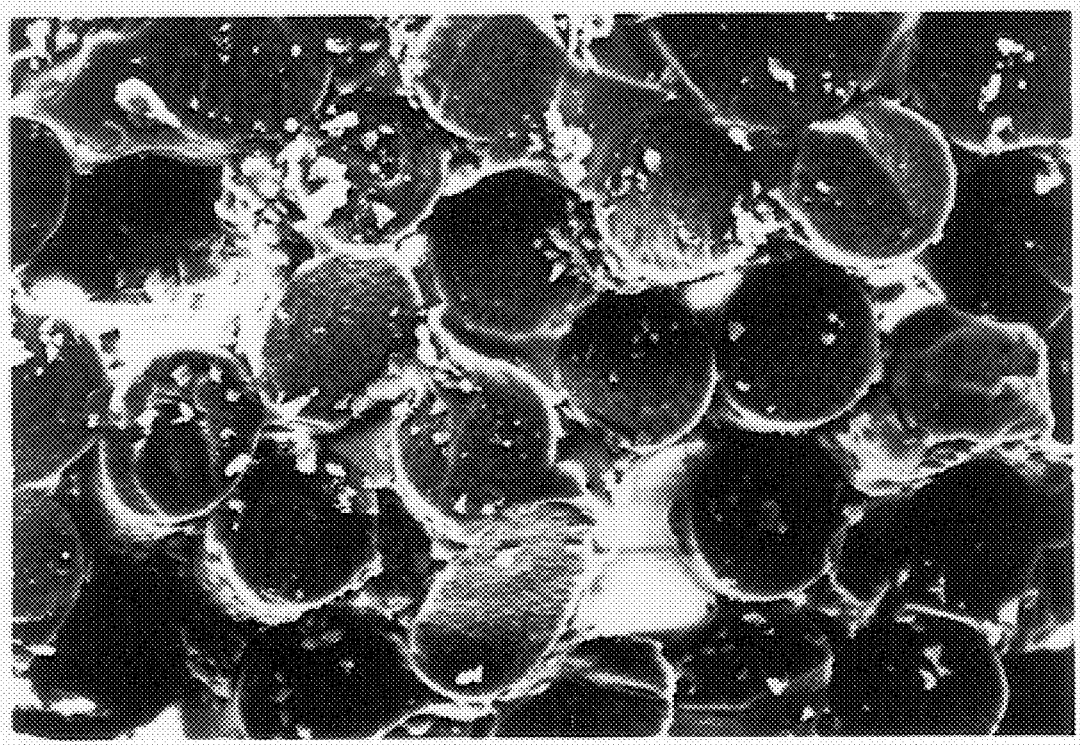
Figure 8:
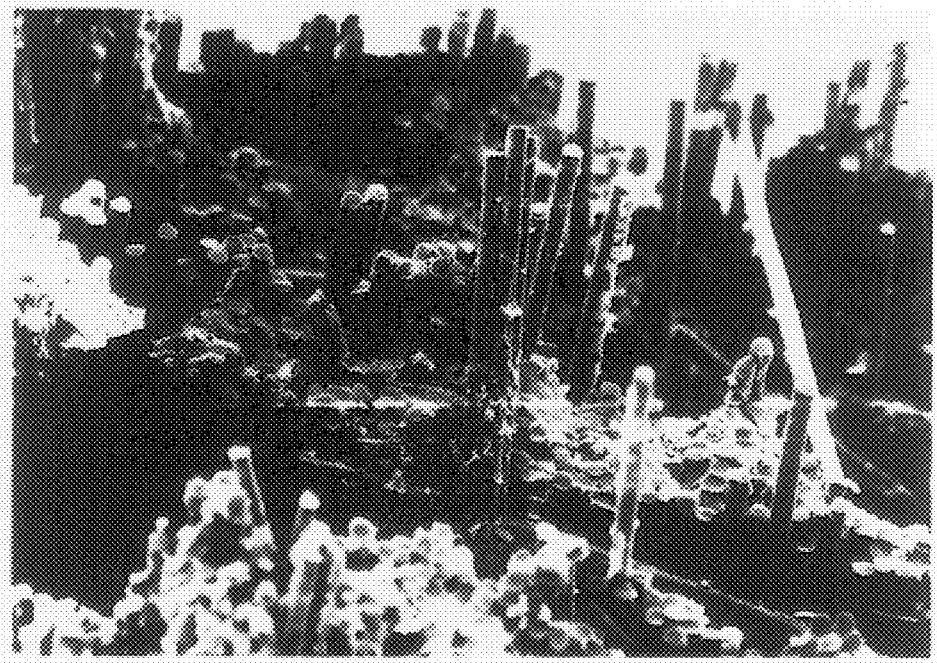
FIGS. 8 and 9 show the surface of fracture of the composite material according to the invention. The changed fracture behavior can be clearly seen from the so-called "pull-out". During the stress on the composite material, individual fibers are drawn from their original positions, see FIG. 9. This results in a dissipation of the stress energy which is equivalent to the prevention of catastrophic failure of the material (brittle fracture). As FIGS. 6 and 7 show, the brittle fracture behavior is characterized by a smooth break through both matrix and fibers. When the maximum load is reached, total failure immediately occurs. In contrast, the materials according to the invention show failure tolerance in that the breaking takes place in a controlled way to prevent catastrophic failure.
Figure 9:
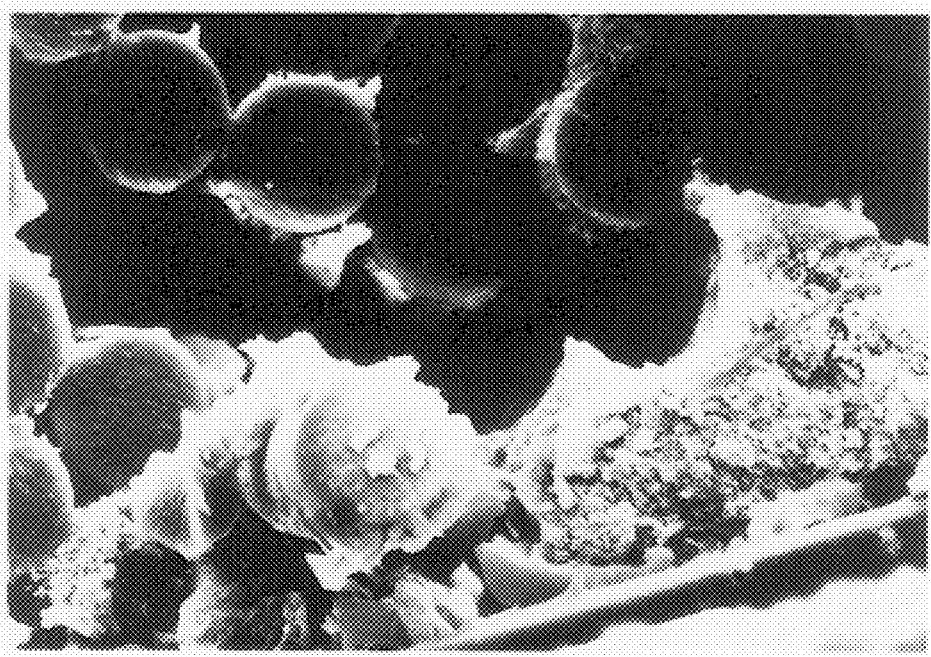
Figure 10:
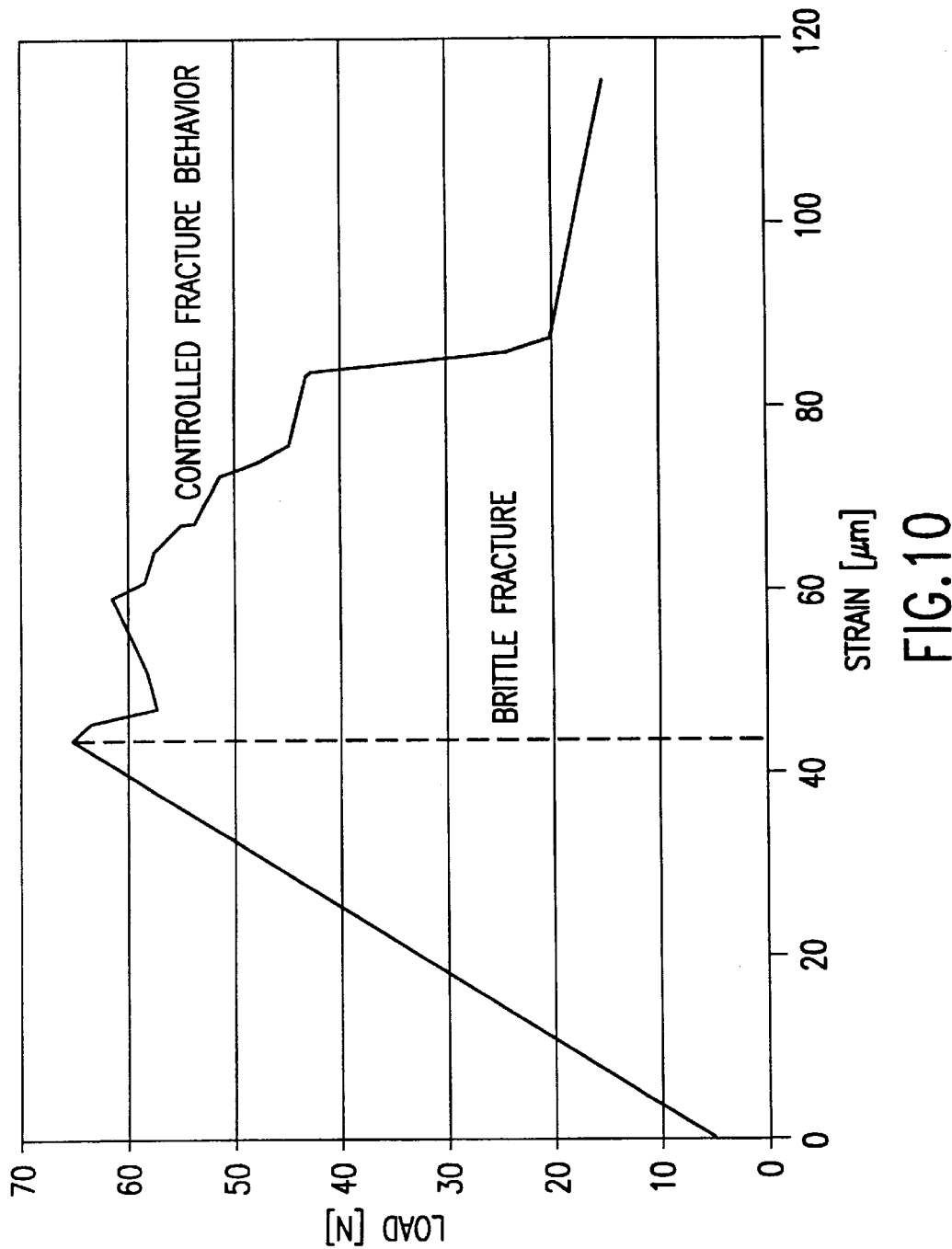
FIG. 10 represents the graphical evaluation of bending tests for the characteristic course of breaking of the composite materials according to the invention. For comparison, the otherwise typical curve for composite materials without coated fibers is drawn; it represents a brittle fracture behavior.

$LaAl_{11}O_{18}$

To 100 ml of a 2.66 M solution of aluminum nitrate nonahydrate in absolute ethanol was added 3.70 ml of 2,4-pentanedione (13.5 mole percent, based on the aluminum content), and the reaction mixture was stirred for 30 min. Then, 52.5 ml of an 0.462 M solution of lanthanum nitrate hexahydrate in absolute ethanol was added with continuous intense stirring, and the reaction mixture was maintained at 40° C. for a period of 10 to 30 min. A slightly viscous sol was obtained which is directly employed for wetting the fiber material.

Example 2

By analogy to Example 1, a corresponding sol was prepared, but the amount of 2,4-pentanedione used was 1 mole percent.

Example 3

By analogy to Example 1, a corresponding sol was prepared, but the amount of 2,4-pentanedione used was 10 mole percent.

Example 4

By analogy to Example 1, a corresponding sol was prepared, but the amount of 2,4-pentanedione used was 15 mole percent.

Example 5

Preparation of the failure-tolerant fiber-reinforced composite material.

A commercially available fiber fabric Nextel® 720 with a diameter of the filaments of about 12 μm containing a crystalline fiber of α-aluminum oxide and mullite was coated as follows. For preparing the fabrics, the fabric sheet was first heated in air to 700° C. in order to remove the production-related content of organic auxiliary agents of about 2% by weight.

The purified fiber fabric was dipped in the viscous sol described in Example 1 and, after a short wetting time for complete wetting, slowly withdrawn vertically. The thus wetted fabric was first stored in air in a free hanging condition. Gelling of the applied sol could be observed after a short period of time already. This process step was subsequently repeated several times (at least four times) in order to obtain a sufficiently thick coating, followed by the drying process. The drying of the coated fiber fabric was preferably performed in a free hanging condition according to the following schedule:

| Step | Temperature, ° C. | Duration, h | Pressure, mbar |
|---|---|---|---|
| 1 | 40 | 2 | atmospheric |
| 2 | 20 | 24 | 50 |
| 3 | 50 | 4 | <1 |
| 4 | 75 | 8 | <1 |
| 5 | 100 | 3 | <1 |
| 6 | 150 | 3 | <1 |
| 7 | 175 | 8 | <1 |
| 8 | 200 | 3 | <1 |
| 9 | 250 (up to 400° C.) | 3 | <1 |

Infiltration of the Coated Fiber Fabric With a Mullite Precursor
Preparation of the Mullite Precursor 50 g (0.133 mol) of $Al(NO_3)_3 \cdot 9H_2O$ was dissolved in 50 ml of ethanol p.a. with stirring (mixture I). At the same time, 0.17 g (0.044 mol) of tetraethoxysilane was taken up in 50 ml of ethanol p.a. and homogenized (mixture II). Then, mixtures I and II were combined, and the thus obtained sol was homogenized with stirring for 15 minutes.

The preliminarily prepared coated fiber fabrics were vertically dipped in the sol by analogy to the dip coating process, and, after a short wetting time for complete wetting, slowly withdrawn vertically. The thus wetted fabric was first stored in a free hanging condition at an ambient temperature of 20° C. and a pressure of <50 mbar. Gelling of the applied sol could be observed after a short period of time already. This process step was subsequently repeated several times (up to five times) in order to obtain sufficient infiltration, followed by the drying process. The drying of the infiltrated fiber fabric was preferably performed in a free hanging condition according to the following schedule:

| Step | Temperature, ° C. | Duration, h | Pressure, mbar |
|---|---|---|---|
| 1 | 40 | 0.5 | atmospheric |
| 2 | 20 | 10 | 50 |
| 3 | 50 | 1 | <1 |
| 4 | 75 | 2 | <1 |
| 5 | 100 | 3 | <1 |
| 6 | 150 | 3 | <1 |
| 7 | 175 | 3 | <1 |
| 8 | 200 | 3 | <1 |

Sintering of the Composite Materials Under Hot-Press Conditions
The fabrics prepared by the process described above were stacked flush and sintered under the following hot-press conditions:

Sintering temperature: 1250° C.
Molding pressure: 10 MPa
Holding time at 1250° C.: 30 min
Properties of the composite materials:
fracture resistance ($y_f$): 50 to 200 MPa (depending on the sintering process and fiber content);
stepwise, controlled fracture which extends through a strain of 80 μm to 150 μm.

Example 6
Coating of the Continuous Fiber Bundles

Continuous fiber bundles made of continuous filaments having diameters around 12 μm, Nextel® 720 of 3M, were converted to the desired fibers coated in a novel manner by means of an especially developed coating and winding apparatus in one working cycle.

The continuous fiber bundles supplied by the manufacturer were wound off and passed through a tubular oven the hottest zone of which had 950° C. In this reaction zones the organic auxiliary agents which covered the ceramic continuous fibers due to their production process were removed without a residue and without any damage to the fibers. Before the continuous fiber bundle passed the coating sol described in Examples 1 to 4, it was diverged by a special yarn guiding into individual continuous filaments running in parallel. This ensured uniform coating of the individual fiber strands. After the continuous filaments oriented in parallel had passed the coating sol, they were directed vertically upwards and recombined into a bundle. The vertical distance passed was one meter and resulted in an additional coating by the coating material running back along the continuous fiber bundle. Superfluous coating material was removed by a stripper at the end of the distance and recycled to the storage tank for the coating sol. Then, the continuous fiber bundle passed a short, two-step drying zone (temperatures: 180 and 130° C.) to remove the alcohol solvent. This was followed by the controlled winding up of the coated continuous fiber bundle.

The actual drying of the coated continuous fibers was effected by analogy to Example 5, and so was the melt impregnation. After the completion of this processing step, the continuous fiber bundle was again wound off fracture-free, and the bundle or, alternatively, after separation into individual continuous fibers without any difficulty, the fibers were processed into composite materials by analogy to Example 5.

What is claimed is:

1. A process for coating oxidic fibrous materials with metal aluminates having the formula $LaAl_{11}O_{18}$ or $CeAl_{11}O_{18}$, comprising:

(a) immersing the fibrous material in a sol which is derived from a cerium or lanthanum compound selected from the group consisting of cerium nitrate, cerium acetate, cerium oxalate, cerium acetylacetonate, lanthanum nitrate, lanthanum acetate, lanthanum oxalate and lanthanum acetylacetonate, and an aluminum compound selected from the group consisting of aluminum nitrate, aluminum acetylacetonate, aluminum acetate and aluminum oxalate, whereby said fibrous materials are coated with metal aluminates having the formula $LaAl_{11}O_{18}$ or $CeAl_{11}O_{18}$;

b) removing the fibrous material from the sol after the fibrous material is wetted;

c) drying the fibrous material at temperatures ≦400° C. for at least 1 hour under pressure of less than or equal to 5 mbar;

d) introducing the fibrous material into a desired matrix wherein the material is treated at a temperature of >600° C.

2. The process according to claim 1, wherein the fibrous material is selected from the group consisting of filaments, fibers, continuous filaments, fiber bundles, non-woven, knitted, and woven fabrics.

3. The process according to claim 1, wherein the fibrous materials being coated have fiber diameters from 5 to 150 μm.

4. The process according to claim 3, wherein the oxidic fibrous materials are comprised of mullite/α-$Al_2O_3$.

5. The process according to claim 3, wherein the fibrous materials being coated have fiber diameters from 5 to 15 μm.

6. The process according to any one of claims 2–5 and 1, wherein said metal aluminate has the formula $LaAl_{11}O_{18}$.

7. The process according to any one of claims 2–5 and 1, wherein the fibrous material is melt-impregnated under vacuum via a technique involving crystal water separation, nitrate separation, crystal water evaporation, nitrate evaporation, oxidation of organic residues with evaporation of hydrocarbons or carbon oxides or oxidation of the organic residues with separation of hydrocarbons or carbon oxides.

8. The process according to any one of claims 2–5 and 1, wherein the fibrous material, after being introduced in the desired matrix, is sintered under hot-press conditions.

* * * * *